United States Patent Office.

WILLIAM FOOTNER, OF CHICAGO, ILLINOIS, ASSIGNOR TO WILLIAM J. FOOTNER, OF SAME PLACE.

Letters Patent No. 77,970, dated May 19, 1868.

IMPROVEMENT IN CONSOLIDATING COAL-DUST FOR FUEL.

*The Schedule referred to in these Letters Patent and making part of the same.*

TO ALL WHOM IT MAY CONCERN:

Be it known that I, WILLIAM FOOTNER, of Chicago, in the county of Cook, and State of Illinois, have invented or discovered a new Method of Consolidating Coal-Dust, and Utilizing the same for Fuel; and I do declare that the following is a full, clear, and exact description of such invention or discovery, sufficient to enable others to use the same.

The coal should be first well pulverized, so as not to contain any lumps, which may be done in any convenient manner. To one ton of coal-dust I add eight pounds of glue, dissolved in twenty gallons of water. I then thoroughly mix the dust and glue-solution, forming a thick paste. This paste I place in moulds, of suitable form and size, and subject the paste to pressure. I recommend pressure of from fifteen to twenty tons to the square inch, though a greater or less degree may be used. The glue is prepared in the usual manner, being first placed in cold water, and then dissolved by the application of heat. Cylindrical moulds, three inches in diameter, and from two to four inches deep, will be suitable for ordinary use. The pressure may be applied by any known method, but provision should be made for the escape of air and the watery particles which will be pressed out. The blocks may be removed from the moulds immediately after being pressed. When removed, they should be permitted to dry three or four days before handling, after which time they will be hard, and can be handled without breaking. While drying, they should not be exposed to storms.

In burning, the prepared blocks retain their form until consumed. The glue being thoroughly mixed with the dust comes in contact with each particle, and, in fact, the application of heat does not consume the glue and leave the particles of dust to fall apart, but the prepared block burns substantially like a lump of coal.

It will be observed that there is but a small portion of foreign matter introduced, and the nature of the glue is such that in burning the consolidated dust, the quantity of smoke will not be perceptibly greater than that from coal of the same kind as the dust.

My method may be successfully used both with anthracite and bituminous-coal dust.

Having thus fully described my invention, what I claim as new, and desire to secure by Letters Patent, is as follows:

Consolidating particles of coal by mixing with a solution of glue, and compressing, substantially as and for the purposes specified.

WILLIAM FOOTNER.

Witnesses:
L. L. BOND,
E. A. WEST.